United States Patent Office

3,338,704
IRON FROM NATURAL MAGNETITE ORES
Sebastian Marc Laurent, Greenwell Springs, and C F Gray, Baton Rouge, La., assignors to Esso Research and Engineering Company, a corporation of Delaware
No Drawing. Filed Dec. 21, 1964, Ser. No. 420,093
7 Claims. (Cl. 75—1)

This invention relates to the treatment of oxidic iron ores, particularly magnetite ores, to produce sponge iron. In particular, it relates to an improved fluidized iron ore process for preoxidation treatment of magnetite ores under conditions which facilitate subsequent reduction of such ores to sponge iron.

It is known to reduce oxidic iron ores, i.e., those consisting essentially of iron oxides, to substantially metallic iron via contact of particulate ores at elevated temperatures with reducing gases. In certain of such processes, the iron ore solids particles are suspended in an ascending stream of reducing gas to form a fluidized bed, i.e., one wherein the solids are suspended in dense phase so that the total gas-solids system takes on many of the characteristics of a boiling liquid having, inter alia, a definitely defined liquid level.

Often, fluidized iron ore processes are staged, i.e., the ore is separated into a plurality of fluidized beds each at different stages of reduction. Generally, the beds of oxides are successively contacted and reduced by upflowing reducing gases as the solids move countercurrently or gravitate, generally downwardly, from one stage or zone to the next. In typical systems, the iron oxides are reduced to the next lower state of oxidation as the ore moves downwardly from one stage to the next. From the final stage is removed the sponge iron product viz., an iron produced under conditions wherein neither the oxides nor the iron product is melted during the treatment. The sponge iron is generally compacted into briquettes which may constitute a charge to a blast furnace.

Such reduction processes have worked quite well in the reduction of many oxidic iron ores, but they have not proven feasible in the treatment of natural magnetite ores. Natural magnetite ores are those ores found in nature; and, these contain quantities of the magnetic oxide of iron, i.e., magnetite. The concentration of magnetite within such ores is highly variable but often ranges to well over 90 weight percent concentration of magnetite. Low grade magnetite ores are characterized as those which contain low quantities of magnetite, but usually at least about 15 percent, and higher, of the magnetic oxides of iron. Such ores, particularly high grade ores, can be reduced only with great difficulty, if at all, when normal reduction conditions are employed. The difficulty of reducing the natural magnetite ores is sharply contrasted with the reduction of by-product magnetite ores, e.g., mill scale which occurs as the result of steel mill operations. While by-product magnetite ores are reduced only with some considerable difficulty, and even then usually to provide low grade products, the normal reduction of a natural magnetite ore is entirely impractical.

In the treatment of iron ores which contain little or no magnetite, reduction generally proceeds with relative ease and the oxides are generally reduced through the various stages of oxidation from a higher oxidation level to the next lower oxidation level. Thus, ferric oxide may be reduced to magnetic oxide of iron in a ferric reduction stage or zone; the magnetic oxide of iron may then be reduced to ferrous oxide in a ferrous reduction stage or zone; and, finally, the ferrous oxide can be further reduced in a different stage to substantially metallic iron. Typical of such reduction process, then, is one involving the treatment with hydrogen, carbon monoxide, or both, of an ore containing goethite ($Fe_2O_3 \cdot H_2O$), hematite ($Fe_2O_3$), and wusite ($FeO$). These oxides, e.g., are readily reduced in fluidized processes at temperatures ranging from about 1000–1500° F. by providing a holdup time ranging from about 2 to about 6 hours.

The substantial reduction of a natural magnetite ore, especially a high grade ore, at such conditions is simply not possible. The natural magnetic oxides of iron do not readily reduce. An exorbitantly long treating time is required to effect any substantial degree of reduction. For this reason, the treatment of natural magnetite ores in conventional manner is not feasible and these ores are generally unsuitable for commercial use. If such ores are to be handled at all, the magnetic oxides of iron must be separated from the ore. Obviously, even the practicality of this method increases in direct relationship to the concentration of magnetic oxides contained in the ore.

Iron is, of course, a basic commodity to any industrial economy. Available ores run the gamut from low grade to rich ores, to those profitable to use and those too poor for commercial use. Natural magnetite ores fit within the latter category with regard to use by existing processes. Upgrading of the ores, or of processes which can handle such ores, is an extremely worthwhile objective, and the introduction of a suitable method which would facilitate and make feasible the treatment of nautral magnetite ores would represent a significant step forward in the state of the art.

It is accordingly the primary objective of the present invention to obviate the above and other prior art deficiencies and, specifically, to provide a new and improved process to facilitate the reduction of magnetite ores. In particular, it is an object to provide an improved method for the treatment of particulate magnetite ores for production of sponge iron. More particularly, it is an object to provide a new and improved fluidized iron ore process for the pretreatment and conditioning of natural magnetite ores followed by subsequent reduction.

These and other objects are achieved in accordance with the present process which contemplates heating and oxidizing particulate natural magnetite ore sufficiently to convert the magnetite, i.e., the magnetic oxides of iron, of the ore to hematite having an average crystallite size ranging, preferably, from substantially about 200 A. (Angstrom units) to about 500 A., and then discontinuing the oxidation. More preferably, the crystallite size should range from about 250 A. to about 400 A.

In determining average crystallite size, the value obtained, and referred to above, is the average of a population of crystals, the crystallite side of which is such that ninety-five percent of the population falls within ten percent of the average. This means that ninety-five percent of the crystallite sizes will vary within ten percent of the mean or average in a negative or positive direction. In other words, the ninety-five percent determination is that area normally defined as falling within two sigma (two standard deviations) of the mean of a normal or Gaussian distribution. The determination is made at ambient temperature, i.e., at about 25° C. to about 30° C.

To provide proper crystallite size, the oxidation is discontinued prior to complete conversion of the magnetite to hematite. Generally, the oxidation treatment is conducted until from about 60 to about 95 percent of the magnetic oxides of iron is converted to hematite. Preferably, the oxidation is conducted until from about 80 to about 95 percent of the magnetic oxides is converted to the higher oxidation state. The oxidation is stopped short of complete conversion of the magnetite to hematite because at the state of complete conversion of the magnetic oxides of iron to hematite the crystallite size of the particles is too large. Beyond the stage of complete conversion of magnetite to hematite, the crystallite size of the hematite continues to grow and, in fact, increases at a very rapid rate. Surprisingly, it has been discovered that the magnetic oxides of iron of the natural magnetite ores treated in accordance with this invention are converted to forms of hematite possessed of crystallite structures which can be easily subsequently reduced, particularly in fluidized iron ore reduction processes. Moreover, decrepitation during the oxidation, or subsequent reduction is very low.

In specific embodiments the magnetite ore is fluidized and heated at temperatures ranging from about 1200° F. to about 2200° F. and oxidized in the presence of oxygen to convert the magnetite to hematite having a crystal structure of average crystallite size ranging preferably from about 200 A. to about 500 A. and, more preferably, ranging from about 250 A. to about 400 A. Generally, crystallite size should not be greater than about 500 A., and preferably should be less. This is because as particle size increases, particularly above 500 A., the crystal structure changes to such extent that reduction becomes increasingly difficult. Crystal size, in general, should not be less than about 200 A. because of the severity of the problem of decrepitation, i.e., splintering and cracking of the iron ore solids particles to produce fines. Preferably, the magnetite ore is fluidized and oxidized at a temperature ranging from about 1400° F. to about 1800° F. or at a temperature sufficiently low to inhibit or prevent bogging, i.e., a phenomenon manifested by a sticking together of the ore particles. At the lower temperatures the growth of the hematite crystals from the magnetite is also more easily controlled.

In accordance with a preferred mode of practicing this invention, a particulate ore containing substantial quantities of natural magnetic oxides of iron is fluidized and oxidized by contact with an oxygen-containing gas, e.g., air, under conditions which do not permit of a significant amount of decrepitation. Decrepitation is significantly reduced not only by providing a relatively low temperature—viz., ranging from about 1400° F. to about 1800° F.—but, particularly, by providing a substantially uniform oxidation rate. This requires control of the amount of oxygen entering the reaction, the maintaining of a given temperature-time relationship during the oxidation reaction, or a combination of these conditions.

A feaure of this invention is that considerable quantities of oxides more highly oxidized than magnetite, e.g., hematite, can be contained within the ore but yet, surprisingly, these oxides do not grow at a sufficiently rapid rate to cause the formation of substantial amounts of the hematite crystals of crystallite size greater than that desired. It is believed that the crystallite size of the natural hematite crystals grow at a very slow rate because there is little or not transition from one state of oxidation to another. This is, of course, contrasted with the magnetite which changes from the lower to the higher oxidation state, i.e., form Fe$_3$O$_4$ to Fe$_2$O$_3$. This is also contrasted with observations wherein it appears that the crystallite size of the converted magnetite grows relatively rapidly even after the transition of all the magnetite to hematite. In general, however, it is preferable that magnetite ore contain at least about 15 percent, and more preferably at least about 40 percent (by weight) of the naturally occurring magnetic oxide of iron. Preferably, also, no more than about 50 percent, and more preferably no more than about 25 percent by weight, of oxides more highly oxidized than the magnetic oxide of iron should be contained in the ore. Where an ore contains too much of the more highly oxidized form of the iron, this oxide then should be separated from the ore or blended with other natural magnetite ore so that the concentration of the natural hematite in the treated ore will be lessened.

In a preferred combination, the magnetite ore is pre-oxidized by feeding the ore into a fluidized iron ore oxidation stage, or stages, and following this the ore is treated in a series of reduction zones at temperatures ranging from about 1000° F. to about 1800° F. and, preferably, at temperatures ranging from about 1200° F. to about 1500° F. The reduction steps include, in particular, one or more ferric reduction stages followed by one or a plurality of ferrous reduction stages, all operated at the same or different temperatures, wherein the ore is converted to a substantially metallic iron sponge.

The method will be better understood by reference to the following non-limiting examples which bring out more fully the salient features of the invention.

*Example 1*

A natural New Zealand Sands ore consisting essentially of 98 weight percent natural magnetite (Fe$_3$O$_4$) is fluidized in a bed at 1400° F. and treated with air for sixteen hours to oxidize nearly ninety percent of the magnetite to hematite, i.e., ferric oxide. At the end of fourteen hours, the average crystallite size of the hematite is 310 A.

The hematite is then reduced with hydrogen at 1400° F. in a fluidized bed, and it is found that the hematite is completely reduced to metallic iron, i.e., substantially 100 percent reduction, in fifteen minutes. Further, the amount of decrepitation in either the oxidation or the subsequent reduction is insignificant.

In contrast, when the same magnetite ore is subjected to reduction under identical conditions but without the initial oxidation pretreatment, it is found at the end of 4½ hours, when the test is arbitrarily terminated, that only about 33 percent of the magnetite is reduced.

By way of further comparison, when a mill scale (seventy-five percent wustite and twenty-five percent magnetite) is oxidized as in the foregoing, the mill scale is completely converted to hematite in thirty minutes and the average crystallite size of the hematite particles is 610 A. Further, decrepitation is severe, the amount of fines increasing by eleven weight percent during this period. Moreover, on subsequent reduction at the conditions described, two hours are required for the reduction of the hematite.

*Example 2*

When the oxidation step of Example 1 is repeated at 1800° F., less than one-eighth of the time is required to completely convert the magnetite to hematite. The amount of decrepitation as contrasted with Example 1 is insignificant.

The oxidation of the magnetite is continued beyond ninety percent conversion, but short of complete conversion and until an average crystallite size growth of 450 A. is obtained. When the hematite is then reduced as in the foregoing example, approximately one hour is required to achieve an eighty-five percent reduction. Reduction of hematite crystals of this crystallite size then is sharply contrasted with the reduction of those crystals of the foregoing example (310 A.) wherein only one-fourth the time is required for the reduction.

In striking contrast, also, when the crystallite size of the hematite produced from natural magnetite is continued to complete conversion and the average crystallite size permitted to grow to just 800 A., the time required even for an incomplete reduction is 24 hours. In fact, at the end of this period when the test is arbitrarily discontinued, it is found that the reduction is only ninety percent.

A novel feature of the invention, as stated, is that natural magnetite ores can be oxidized, then subsequently easily and conveniently reduced. In fact, the examples and demonstrations show this. This is surprising because it is known that natural magnetites are especially stubborn in their reduction, far more so than by-product or even the "man-made" magnetic oxides of iron. To show this difference the following example, giving comparative data, is set forth.

*Example 3*

A very finely divided mill scale consisting essentially of wustite and magnetite and the New Zealand Sands ore of comparable size are each fluidized with 57 mole percent hydrogen in nitrogen at 1300° F. for four and one-half hours. At the end of the period only 0.6 percent of the New Zealand Sands ore is metallized while 53.8 percent of the mill scale is metallized. Thus, the natural ore is approximately 90 times more difficult to reduce than the mill scale. Moreover, where both the mill scale and the natural ore are first oxidized and then reduced with a 60:40 hydrogen:nitrogen mixture at 1400° F., the mill scale becomes severely bogged quite readily while the natural ore is readily reduced without bogging.

It is apparent that certain modifications can be made in the process without departing the spirit and scope of the invention.

By the use of this invention, oxidation of natural magnetite to hematite of desirable crystallite size is readily accomplished and, this done, the hematite can be rapidly and completely reduced to yield sponge iron.

The oxidation produces these outstanding results because major and critical structural changes are produced with the crystal make-up of the hematite produced from the magnetic iron oxide particles. The resulting hematite thus provides a widely open latticed framework to which the reducing gases are more readily accessible. Further, despite the porous and grainy surface produced in the hematite particles, reduction leaves this lattice framework intact so that substantial decrepitation does not occur.

Having described the invention, what is claimed is:

1. A process for the treatment of natural magnetite ore containing at least about 15 weight percent of the magnetic oxides of iron and not more than about 25 weight percent of higher oxides of iron, comprising fluidizing the particulate ore and oxidizing it to a higher state of oxidation, continuing said oxidation and converting from about 60 to about 95 percent of the magnetite to hematite, and growing the crystalline structure of the hematite to an average crystallite size ranging from about 200 A. to about 500 A., discontinuing the oxidation, and then fluidizing and treating the ore with reducing gases to produce substantially metallic iron.

2. The process of claim 1 wherein the oxidation is continued until the hematite is of an average crystallite size ranging from about 250 A. to about 400 A., prior to the reduction of the ore.

3. The process of claim 1 wherein the temperature of the oxidation and reduction reactions range from about 1400° F. to about 1800° F.

4. The process of claim 1 wherein the oxidation is conducted until from about 80 to about 95 percent of the magnetic oxides is converted to hematite.

5. The process of claim 1 wherein the natural magnetite ore contain at least about 40 percent of magnetic oxide of iron.

6. A process for the treatment of natural magnetite ore containing at least about 15 weight percent of the magnetic oxides of iron and not more than about 25 weight percent of higher oxides of iron, comprising fluidizing the magnetite ore at temperatures ranging from about 1200° F. to about 2200° F. with gases containing sufficient oxygen to oxidize the magnetic oxides of iron of the ore to hematite, continuing the oxidation until from about 60 to about 95 percent of the magnetic oxides of iron have been converted to hematite particles of average crystallite size ranging from about 200 A. to about 500 A., discontinuing the oxidation and then treating the ore with reducing gases to produce sponge iron.

7. The process of claim 6 wherein the magnetite ore is oxidized to hematite by contact with an oxygen-containing gas at temperatures ranging from 1400° F. to about 1800° F., then subsequently reducing the hematite to substantially ferrous oxide in a fluidized bed at temperatures ranging from about 1000° F. to about 1500° F., and then further reducing the ferrous oxide in a fluidized bed at temperatures ranging from about 1200° F. to about 1600° F. to produce substantially metallic iron.

References Cited

UNITED STATES PATENTS

| | | | |
|---|---|---|---|
| 1,979,729 | 11/1934 | Brown | 75—34 |
| 2,282,124 | 5/1942 | Fahrenwald | 75—34 |
| 2,445,648 | 7/1948 | Truesdale | 75—34 |
| 2,925,336 | 2/1960 | Stowasser | 75—3 |
| 2,990,268 | 6/1961 | De Vaney | 75—5 |
| 3,189,437 | 6/1965 | Boucraut | 75—34 |
| 3,244,507 | 4/1966 | Linney | 75—5 |
| 3,257,198 | 6/1966 | Volk et al. | 75—1 |

BENJAMIN HENKIN, *Primary Examiner.*